United States Patent
Cheng et al.

(10) Patent No.: US 11,731,119 B2
(45) Date of Patent: Aug. 22, 2023

(54) INTEGRATED CATALYST SYSTEM FOR STOICHIOMETRIC-BURN NATURAL GAS VEHICLES AND PREPARATION METHOD THEREFOR

(71) Applicant: Sinocat Environmental Technology Co., Ltd., Chengdu (CN)

(72) Inventors: Yongxiang Cheng, Chengdu (CN); Yun Wang, Chengdu (CN); Hongyi Du, Chengdu (CN); Ganxue Wu, Chengdu (CN); Xueqing Zhou, Chengdu (CN); Guangfa Zu, Chengdu (CN); Yi Yan, Chengdu (CN); Dongdong Wu, Chengdu (CN); Yun Li, Chengdu (CN); Qizhang Chen, Chengdu (CN)

(73) Assignee: Sinocat Environmental Technology Co., Ltd., Chengdu (CN)

( * ) Notice: Subject to any disclaimer, the term of this patent is extended or adjusted under 35 U.S.C. 154(b) by 247 days.

(21) Appl. No.: 17/040,531

(22) PCT Filed: May 30, 2019

(86) PCT No.: PCT/CN2019/089172
§ 371 (c)(1),
(2) Date: Sep. 22, 2020

(87) PCT Pub. No.: WO2020/073667
PCT Pub. Date: Apr. 16, 2020

(65) Prior Publication Data
US 2021/0023542 A1    Jan. 28, 2021

(51) Int. Cl.
| | | |
|---|---|---|
| *B01J 21/04* | (2006.01) | |
| *B01J 21/06* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 23/72* | (2006.01) | |
| *B01J 23/745* | (2006.01) | |
| *B01J 23/83* | (2006.01) | |
| *B01J 35/00* | (2006.01) | |
| *B01J 35/04* | (2006.01) | |

(Continued)

(52) U.S. Cl.
CPC ........ *B01J 35/0006* (2013.01); *B01D 53/945* (2013.01); *B01J 21/04* (2013.01); *B01J 23/10* (2013.01); *B01J 23/44* (2013.01); *B01J 23/464* (2013.01); *B01J 29/74* (2013.01); *B01J 29/85* (2013.01); *B01J 37/0228* (2013.01); *B01J 37/0236* (2013.01); *B01J 37/0244* (2013.01); *B01J 37/04* (2013.01); *B01J 37/088* (2013.01); *F01N 3/101* (2013.01); *F01N 3/2842* (2013.01); *F23G 7/06* (2013.01); *B01D 2255/1021* (2013.01); *B01D 2255/1023* (2013.01); *B01D 2255/1025* (2013.01); *B01D 2255/20761* (2013.01); *B01D 2255/50* (2013.01); *B01D 2255/9022* (2013.01); *F01N 2330/06* (2013.01); *F01N 2330/30* (2013.01); *F01N 2370/02* (2013.01)

(58) Field of Classification Search
CPC . B01J 21/04; B01J 21/066; B01J 23/10; B01J 23/42; B01J 23/44; B01J 23/464; B01J 23/63; B01J 23/72; B01J 23/745; B01J 23/83; B01J 35/0006; B01J 35/04; B01J 37/0228; B01J 37/0236; B01J 37/0244; B01J 37/04; B01J 37/088; B01J 29/74; B01J 29/85; B01D 53/945; F01N 3/101; F01N 3/2842
USPC .......... 502/60, 258–262, 302–304, 332–339, 502/349, 355, 415, 439, 527.19
See application file for complete search history.

(56) References Cited

U.S. PATENT DOCUMENTS 5,164,350 A * 11/1992 Abe .................... B01J 37/0242
502/66
5,179,053 A    1/1993 Subramanian et al.
(Continued)

FOREIGN PATENT DOCUMENTS

| CN | 108136373 A | 6/2018 |
|---|---|---|
| CN | 108472636 A | 8/2018 |
| WO | 2013029149 A1 | 3/2013 |

OTHER PUBLICATIONS

International Search Report of International Application No. PCT/CN2019/089172 dated Aug. 23, 2019; 5 pgs.; China National Intellectual Property Administration; Beijing, Republic of China.

*Primary Examiner* — Cam N. Nguyen
(74) *Attorney, Agent, or Firm* — Andrew D. Fortney; Central California IP Group, P.C.

(57) ABSTRACT

Disclosed in the present invention is an integrated catalyst system for stoichiometric-burn natural gas vehicles, the catalyst system consisting of a three-way catalyst, a molecular sieve catalyst, and a base body, the three-way catalyst and the molecular sieve catalyst being coated on a surface of the base body. In the integrated three-way catalyst and molecular sieve catalyst system of the present invention, at the same time that pollutants such as CO, HC, and $NO_x$ in the exhaust of stoichiometric-burn natural gas vehicles are processed, the produced byproduct $NH_3$ can also be processed, and the conversion rates of CO, HC, $NO_x$, and $NH_3$ are high.

19 Claims, No Drawings

(51) Int. Cl.
*B01J 37/02* (2006.01)
*B01J 37/04* (2006.01)
*B01J 37/08* (2006.01)
*B01J 29/74* (2006.01)
*B01J 29/85* (2006.01)
*B01D 53/94* (2006.01)
*F01N 3/10* (2006.01)
*F01N 3/28* (2006.01)
*F23G 7/06* (2006.01)

(56) References Cited

U.S. PATENT DOCUMENTS

| | | | | |
|---|---|---|---|---|
| 5,185,305 A | * | 2/1993 | Subramanian | B01J 35/0006 502/65 |
| 5,244,852 A | * | 9/1993 | Lachman | B01D 53/945 423/247 |
| 5,681,788 A | * | 10/1997 | Kanesaka | B01J 29/072 502/64 |
| 6,080,375 A | * | 6/2000 | Mussmann | B01J 37/0246 502/67 |
| 6,348,430 B1 | * | 2/2002 | Lindner | B01D 53/945 502/514 |
| 6,677,264 B1 | * | 1/2004 | Klein | B01J 37/0244 502/79 |
| 8,603,423 B2 | * | 12/2013 | Andersen | C04B 38/0006 502/60 |
| 9,040,003 B2 | * | 5/2015 | Andersen | C04B 38/0006 423/210 |
| 9,145,350 B2 | | 9/2015 | Patience et al. | |
| 9,656,209 B2 | * | 5/2017 | Chang | B01J 37/0063 |
| 9,757,719 B2 | * | 9/2017 | Fedeyko | B01J 37/0244 |
| 9,931,596 B2 | * | 4/2018 | Zheng | B01D 53/9477 |
| 9,968,916 B2 | * | 5/2018 | Chang | B01J 35/0013 |
| 10,906,032 B2 | * | 2/2021 | Zheng | B01J 23/755 |
| 2009/0004081 A1 | * | 1/2009 | Han | B01J 37/0246 423/230 |
| 2012/0003132 A1 | * | 1/2012 | Wang | C10L 3/101 502/65 |
| 2018/0214824 A1 | | 8/2018 | Dumbuya et al. | |
| 2018/0229224 A1 | | 8/2018 | Zheng et al. | |

* cited by examiner ary surface of the base body, wherein
INTEGRATED CATALYST SYSTEM FOR STOICHIOMETRIC-BURN NATURAL GAS VEHICLES AND PREPARATION METHOD THEREFOR This application is a national phase application of International Appl. No. PCT/CN2019/089172, filed May 30, 2019, and claims the benefit of Chinese Patent Application No. 201811168861.5, filed Oct. 8, 2018, incorporated herein by reference in its entirety.

TECHNICAL FIELD

The present invention relates to the technical field of vehicle tail gas catalyst, and particularly to an integrated catalyst system for a stoichiometric-burn natural gas vehicle and a preparation method therefor.

BACKGROUND ART

With increasing living standards, the number of vehicles in China increases year by year. The environmental issue of urban atmospheric pollution is increasingly serious. In order to protect the environment, a higher requirement for tail gas emission control of automobiles is proposed in China. The China V emission standard is implemented at present for natural gas vehicles in China, and the China VI emission standard will come into effect for heavy-duty natural gas vehicles from Jul. 1, 2019. In the China V phase, engines of heavy-duty natural gas vehicles mainly utilize lean combustion, and the post-treatment catalyst for emission is an oxidation catalyst, which is mainly used for purifying carbon monoxide (CO) and hydrocarbons (HC) (mainly methane ($CH_4$)) in the engine tail gas, while nitrogen oxides ($NO_x$) are mainly purified in-engine. With the upgrading of the emission standard, the emission limits will be further reduced. In the China VI standard, the emission limit for $CH_4$ is reduced by 50%, the emission limit for $NO_x$ is reduced by 75%, and a requirement for the emission limit for ammonia ($NH_3$) is included. It is difficult to meet the requirement for the China VI emission limit following the technical route of the China V phase. Therefore, the stoichiometric-burn is used as the main technical route for heavy-duty natural gas engines in the China VI phase, and the three way catalyst (three effects) is used as the post-treatment catalyst.

The three way catalyst can purify three pollutants, i.e., CO, HC and $NO_x$, and is widely used in gasoline vehicles. The three way catalyst used in natural gas vehicles is different from that used in gasoline vehicles, because HC in the tail gas of natural gas vehicles is mainly $CH_4$, which is a hydrocarbon having the most stable chemical structure, and is more difficult to be purified than HC for conventional gasoline vehicles. Therefore, there is a need for a more active catalyst. Typically, a catalyst of precious metal is used. The reactions occurred on the three way catalyst mainly comprise: oxidation reactions of HC and CO: $CO+O_2 \rightarrow CO_2$, and $HC+O_2 \rightarrow CO_2+H_2O$, reduction reactions of NO: $NO+CO \rightarrow CO_2+N_2$, $NO+HC \rightarrow CO_2+N_2+H_2O$, and $NO+H_2 \rightarrow N_2+H_2O$, steam reforming reaction: $HC+H_2O \rightarrow CO_2+H_2$, and water gas shift reaction: $CO+H_2O \rightarrow CO_2+H_2$. Further, the following reactions occur: $2NO+2CO+3H_2 \rightarrow 2NH_3+2CO_2$, and $2NO+5H_2 \rightarrow 2NH_3+2H_2O$. A new pollutant of ammonia ($NH_3$) will be produced through those two reaction. The higher the activity of the catalyst, the more the produced $NH_3$ is. Because the three way window of the three way catalyst for natural gas is narrow and shifts to a rich combustion, a large amount of $NH_3$ will be produced after the three way catalyst is used in a stoichiometric-burn natural gas vehicle which shifts to a rich combustion, which is difficult to meet the requirement for the emission standard of 10 ppm of the China VI phase.

SUMMARY

In order to solve the defect of failing to meet the China VI emission standard due to a large amount of $NH_3$ produced during the treatment on the tail gas with an existing catalyst for a stoichiometric-burn natural gas vehicle, the present invention provides an integrated catalyst system for a stoichiometric-burn natural gas vehicle which integrates a three way catalyst and a molecular sieve and a preparation method therefor. The integrated catalyst system can treat pollutants such as CO, HC and $NO_x$ in a tail gas of a natural gas vehicle, while treating a produced byproduct of $NH_3$.

In order to achieve the above object, the present invention provides the following technical solutions.

An integrated catalyst system for a stoichiometric-burn natural gas vehicle consists of a three way catalyst, a molecular sieve catalyst and a base body, wherein the three way catalyst and the molecular sieve catalyst are coated on a surface of the base body, wherein
  the three way catalyst and the molecular sieve catalyst are combined in the following way:
  the molecular sieve catalyst is uniformly added into a coating layer of the three way catalyst; or
  the molecular sieve catalyst is coated on a surface of the three way catalyst; or
  the molecular sieve catalyst is coated between two layers of the three way catalyst; or
  the three way catalyst and the molecular sieve catalyst are coated in segments, wherein the three way catalyst is coated on a former segment of the base body, and the molecular sieve catalyst is coated on a latter segment of the base body.

In the above-mentioned technical solution, the three way catalyst can purify pollutants such as CO, HC and $NO_x$ in a tail gas of a natural gas vehicle simultaneously, but also produce a large amount of byproduct $NH_3$, resulting in the emission of $NH_3$ far beyond the China VI phase standard limit. In order to control the emission of $NH_3$ below the China VI phase standard limit, the present invention combines the three way catalyst with the molecular sieve catalyst through one of the above ways, which can convert the byproduct $NH_3$ obtained after the purification by the three way catalyst to ammonia and water with a high conversion rate. In contrast to a conventional selective catalytic reduction (SCR) catalyst used for diesel vehicles, for the molecular sieve catalyst, a small pore molecular sieve having a CHA structure is used as a carrier, and platinum, palladium, copper or iron is used as an active component. First, the requirement for the function of the catalyst is different. The main function of the conventional SCR catalyst used for diesel vehicles is to selectively reduce $NO_x$, and the reactions occurred on the catalyst are mainly: $2NH_3+NO_2+NO \rightarrow 2N_2+3H_2O$, and $4NH_3+4NO+O_2 \rightarrow 4N_2+6H_2O$. However, for natural gas vehicles, $NO_x$ is mainly purified by the three way catalyst, and the molecular sieve catalyst for use is mainly used for the oxidation reaction of $NH_3$, and the reaction occurred on the catalyst is: $4NH_3+3O_2 \rightarrow 2N_2+6H_2O$. Second, the use environments are different from each other. The composition of a tail gas of a diesel vehicle is very different from that of a stoichiometric-burn natural gas vehicle. The conventional SCR catalyst used in a diesel vehicle is used in an oxygen rich environment, and the oxygen content in the tail gas is 5-10%. However, the oxygen content in the tail gas of a stoichiometric-burn natural gas vehicle is very low, with an average between 0.1-0.5%. The above-mentioned SCR catalyst has a very low conversion rate for $NH_3$ in such an environment, while the catalyst of the present invention is suitable for using under this condition, and has a very high conversion rate for $NH_3$ under this reaction condition.

Further, a combined loading amount of the three way catalyst and the molecular sieve catalyst is 150 g/L-300 g/L; wherein, a loading amount ratio of the three way catalyst to the molecular sieve catalyst is (1:3)-(3:1).

Here, when applying in segments, a coating height ratio of the former segment three way catalyst and the latter segment molecular sieve catalyst is 2: 1-1:2.

Preferably, the combined loading amount of the three way catalyst and the molecular sieve catalyst is 200 g/L-300 g/L; wherein, the loading amount ratio of the three way catalyst to the molecular sieve catalyst is (1:2)-(2:1).

More preferably, the combined loading amount of the three way catalyst and the molecular sieve catalyst is 200 g/L-250 g/L; wherein, the loading amount ratio of the three way catalyst to the molecular sieve catalyst is (1:1)-(2:1).

Further, for the three way catalyst, a carrier is one of lanthanum-modified aluminum oxide, zirconium oxide, cerium dioxide, and ceria-zirconia solid solution, or a combination thereof and an active component is one of platinum, palladium, and rhodium, or a combination thereof.

Further, in the carrier of the three way catalyst, a weight ratio of the lanthanum-modified aluminum oxide, zirconium oxide, cerium dioxide, and ceria-zirconia solid solution is (0-1):(0-0.2):(0-0.2):(0-1).

Preferably, in the carrier of the three way catalyst, the weight ratio of the lanthanum-modified aluminum oxide, zirconium oxide, cerium dioxide, and ceria-zirconia solid solution is (0-0.8):(0-0.1):(0-0.2):(0.2-1).

More preferably, in the carrier of the three way catalyst, the weight ratio of the lanthanum-modified aluminum oxide, zirconium oxide, cerium dioxide, and ceria-zirconia solid solution is (0.2-0.5):(0-0.1):(0-0.2):(0.2-0.5).

Further, a content of the active component in the three way catalyst is 80-200 g/ft$^3$.

Preferably, the content of the active component in the three way catalyst is 120-180 g/ft$^3$.

More preferably, the content of the active component in the three way catalyst is 120-150 g/ft$^3$.

Further, in the active component of the three way catalyst, a weight ratio of platinum, palladium and rhodium is (0-1):(0.5-1):(0.01-0.5).

Preferably, in the active component of the three way catalyst, the weight ratio of platinum, palladium and rhodium is (0-0.5):(0.5-1):(0.05-0.2).

More preferably, in the active component of the three way catalyst, the weight ratio of platinum, palladium and rhodium is (0.2-0.5):(0.5-0.8):(0.05-0.2).

Further, the carrier of the molecular sieve catalyst is a small pore molecular sieve material, and the active component is platinum, palladium, copper or iron.

Further, the carrier of the molecular sieve catalyst is one or both of an aluminosilicophosphate molecular sieve or an aluminosilicate molecular sieve containing a CHA crystal framework structure.

Further, a content of the active component in the molecular sieve catalyst is 0-5%.

Preferably, the content of the active component in the molecular sieve catalyst is 0.1-3%.

More preferably, the content of the active component in the molecular sieve catalyst is 0.5-2%.

In the integrated three way and molecular sieve catalyst system of the present invention, the base body is preferably a honeycomb ceramic base body.

The present invention also provides a method for preparing the above-mentioned catalyst system, characterized in that, the method comprising steps as follows:

1) Preparation of a Three Way Catalyst Powder:

adding an active component precursor of the three way catalyst to a carrier of the three way catalyst by spraying with stirring, stirring for 1-2 hours after completing the spraying, drying in an oven at 120° C. for 6-8 hours, and then calcining at 500-600° C. for 1-2 hours to obtain the three way catalyst powder;

2) Preparation of a Molecular Sieve Catalyst Powder:

exchanging an active component precursor of the molecular sieve catalyst into a framework of a molecular sieve by an ion exchanging method, washing, filtering, then drying in an oven at 120° C. for 6-8 hours, and calcining at 500-650° C. for 1-2 hours to obtain the molecular sieve catalyst powder; and 3) Preparation of the Integrated Catalyst System:

S01. mixing the three way catalyst powder and the molecular sieve catalyst powder respectively with 1-5 wt. % of binder, and ball milling the obtained mixture to produce a three way catalyst slurry and a molecular sieve catalyst slurry respectively; and mixing the three way catalyst powder and the molecular sieve catalyst powder, then mixing a mixture of the three way catalyst powder and the molecular sieve catalyst powder with 1-5 wt. % of binder, and ball milling the obtained mixture to produce a mixed catalyst slurry; and S02. preparation of the integrated catalyst system applying the mixed catalyst slurry on a surface of a base body, drying, and then calcining at 500-650° C. for 1-2 hours to obtain the integrated catalyst system;

applying the three way catalyst slurry on a surface of the base body, drying, then applying the molecular sieve catalyst slurry, drying, and then calcining at 500-650° C. for 1-2 hours to obtain the integrated catalyst system; or applying ⅓-⅔ of the three way catalyst slurry on a surface of the base body, drying, then applying the molecular sieve catalyst slurry, drying, then applying a remainder of the three way catalyst slurry, drying, and then calcining at 500-650° C. for 1-2 hours to obtain the integrated catalyst system; or applying the three way catalyst slurry on a surface of a former segment of the base body, applying the molecular sieve catalyst slurry on a surface of a latter segment of the base body, drying, and then calcining at 500-650° C. for 1-2 hours to obtain the integrated catalyst system.

The precursors of the active components refer to nitrate, tetraamine nitrate or another inorganic salt of each of the active components. For example, the precursors of the active components are platinum nitrate, palladium nitrate, rhodium nitrate, tetraamineplatinum nitrate, tetraaminepalladium nitrate, chloroplantinic acid and so on. The solution of the active component precursor may be a solution of single active component precursor, a mixed solution of multiple active component precursor, or a mixed solution of a precursor solution and an auxiliary agent solution.

The binder includes, but not limited to, alumina sol and silica sol. During the ball milling, the solid content of the slurry is controlled to 25-50%.

As compared to the existed technologies, the present invention has the following advantageous effects.

The integrated catalyst system for a stoichiometric-burn natural gas vehicle according to the present invention combines the three way catalyst with the molecular sieve catalyst, and can treat pollutants such as CO, HC and $NO_x$ in a tail gas of a natural gas vehicle while treating a produced byproduct $NH_3$, with very high conversion rates for CO, HC, $NO_x$ and $NH_3$.

DETAILED DESCRIPTION

The present invention will be further described in detail below with reference to experimental examples and particular embodiments. However, it should not be understood that the scope of the above subject matter of the present invention is only limited to the following examples, but all technologies achieved based on the present disclosure fall within the scope of the present invention.

The instruments and materials used in the examples are all known products, and can be obtained by purchasing the commercially available products.

Basic Example

An integrated catalyst system for a stoichiometric-burn natural gas vehicle consists of a three way catalyst, a molecular sieve catalyst and a base body, wherein the three way catalyst and the molecular sieve catalyst are coated on a surface of the base body, wherein
  the three way catalyst and the molecular sieve catalyst are combined in the following way:
  the molecular sieve catalyst is uniformly added into a coating layer of the three way catalyst; or
  the molecular sieve catalyst is coated on a surface of the three way catalyst; or
  the molecular sieve catalyst is coated between two layers of the three way catalyst; or
  the three way catalyst and the molecular sieve catalyst are coated in segments, wherein the three way catalyst is coated on a former segment of the base body, and the molecular sieve catalyst is coated on a latter segment of the base body.

For example, the three way catalyst and the molecular sieve catalyst may be combined in the following way:
1) adding the molecular sieve catalyst to the three way catalyst coating, mixing them uniformly, and then applying them on a surface of the base body; or
2) firstly applying a layer of the three way catalyst on a surface of the base body, and then applying another layer of the molecular sieve catalyst, such that the three way catalyst is in the bottom layer and the molecular sieve catalyst is in the top layer; or
3) applying a layer of the three way catalyst on a surface of the base body, then applying another layer of the molecular sieve catalyst, and then applying another layer of the three way catalyst, such that the three way catalyst is in the bottom layer and the top layer, and the molecular sieve catalyst is in the middle layer; or
4) applying the three way catalyst on a former segment of the base body, and applying the molecular sieve catalyst on a latter segment of the base body.

In the above-mentioned technical solution, the three way catalyst can purify pollutants such as CO, HC and $NO_x$ in a tail gas of a natural gas vehicle simultaneously, but also produce a large amount of byproduct $NH_3$, resulting in the emission of $NH_3$ far beyond the China VI phase standard limit. In order to control the emission of $NH_3$ below the China VI phase standard limit, the present invention introduces the molecular sieve catalyst based on the three way catalyst, which can convert the byproduct $NH_3$ obtained after the purification by the three way catalyst to ammonia and water with a high conversion rate. In contrast to a conventional selective catalytic reduction (SCR) catalyst used for diesel vehicles, for the molecular sieve catalyst, a small pore molecular sieve having a CHA structure is used as a carrier, and platinum, palladium, copper or iron is used as an active component. First, the requirement for the function of the catalyst is different. The main function of the conventional SCR catalyst used for diesel vehicles is to selectively reduce $NO_x$, and the reactions occurred on the catalyst are mainly: $2NH_3+NO_2+NO \rightarrow 2N_2+3H_2O$, and $4NH_3+4NO+O_2 \rightarrow 4N_2+6H_2O$. However, for natural gas vehicles, $NO_x$ is mainly purified by the three way catalyst, and the molecular sieve catalyst for use is mainly used for the oxidation reaction of $NH_3$, and the reaction occurred on the catalyst is: $4NH_3+3O_2 \rightarrow 2N_2+6H_2O$. Second, the use environments are different from each other. The composition of a tail gas of a diesel vehicle is very different from that of a stoichiometric-burn natural gas vehicle. The conventional SCR catalyst used in a diesel vehicle is used in an oxygen rich environment, and the oxygen content in the tail gas is 5-10%. However, the oxygen content in the tail gas of a stoichiometric-burn natural gas vehicle is very low, with an average between 0.1-0.5%. The above-mentioned SCR catalyst has a very low conversion rate for $NH_3$ in such an environment, while the catalyst of the present invention is suitable for using under this condition, and has a very high conversion rate for $NH_3$ under this reaction condition.

Further, a combined loading amount of the three way catalyst and the molecular sieve catalyst is 150 g/L-300 g/L; wherein, the loading amount ratio of the three way catalyst to the molecular sieve catalyst is (1:3)-(3:1).

Here, when applying in segments, a coating height ratio of the former segment three way catalyst and the latter segment molecular sieve catalyst is 2: 1-1:2.

Preferably, the combined loading amount of the three way catalyst and the molecular sieve catalyst is 200 g/L-300 g/L; wherein,
  the loading amount ratio of the three way catalyst to the molecular sieve catalyst is (1:2)-(2:1).

More preferably, the combined loading amount of the three way catalyst and the molecular sieve catalyst is 200 g/L-300 g/L; wherein,
  the loading amount ratio of the three way catalyst to the molecular sieve catalyst is (1:1)-(2:1).

For example, the combined loading amount of the three way catalyst and the molecular sieve catalyst may be 150 g/L, 170 g/L, 200 g/L, 230 g/L, 250 g/L, 270 g/L, 300 g/L or so on; and the loading amount ratio of the three way catalyst to the molecular sieve catalyst may be 1:3, 1:2, 1:1, 2:1, 3:1, or so on.

Further, for the three way catalyst, a carrier is one of lanthanum-modified aluminum oxide, zirconium oxide, cerium dioxide, and ceria-zirconia solid solution, or a combination thereof and an active component is one of platinum, palladium, and rhodium, or a combination thereof.

Further, in the carrier of the three way catalyst, a weight ratio of the lanthanum-modified aluminum oxide, zirconium oxide, cerium dioxide, and ceria-zirconia solid solution is (0-1):(0-0.2):(0-0.2):(0-1).

Preferably, in the carrier of the three way catalyst, the weight ratio of the lanthanum-modified aluminum oxide, zirconium oxide, cerium dioxide, and ceria-zirconia solid solution is (0-0.8):(0-0.1):(0-0.2):(0.2-1).

More preferably, in the carrier of the three way catalyst, the weight ratio of the lanthanum-modified aluminum oxide, zirconium oxide, cerium dioxide, and ceria-zirconia solid solution is (0.2-0.5):(0-0.1):(0-0.2):(0.2-0.5).

For example, in the carrier of the three way catalyst, the weight ratio of the lanthanum-modified aluminum oxide, zirconium oxide, cerium dioxide, and ceria-zirconia solid solution may be 0.1:0.2:0.2:1, 0.5:0.1:0.1:0.5, 0.2:0.1:0.2:0.3, 0.8:0.05:0.2:0.2, or so on.

Further, a content of the active component in the three way catalyst is 80-200 g/ft$^3$.

Preferably, the content of the active component in the three way catalyst is 120-180 g/ft$^3$.

More preferably, the content of the active component in the three way catalyst is 120-150 g/ft$^3$.

For example, the content of the active component in the three way catalyst may be 100 g/ft$^3$, 170 g/ft$^3$ or 190 g/ft$^3$.

Further, in the active component of the three way catalyst, a weight ratio of platinum, palladium and rhodium is (0-1):(0.5-1):(0.01-0.5).

Preferably, in the active component of the three way catalyst, the weight ratio of platinum, palladium and rhodium is (0-0.5):(0.5-1):(0.05-0.2).

More preferably, in the active component of the three way catalyst, the weight ratio of platinum, palladium and rhodium is (0.2-0.5):(0.5-0.8):(0.05-0.2).

For example, in the active component of the catalyst, the weight ratio of platinum, palladium and rhodium may be 0.3:0.6:0.1.

Further, the carrier of the molecular sieve catalyst is a small pore molecular sieve material, and the active component is platinum, palladium, copper or iron.

Further, the carrier of the molecular sieve catalyst is one or both of an aluminosilicophosphate molecular sieve or an aluminosilicate molecular sieve containing a CHA crystal framework structure.

Further, a content of the active component in the molecular sieve catalyst is 0-5%.

Preferably, the content of the active component in the molecular sieve catalyst is 0.1-3%.

More preferably, the content of the active component in the molecular sieve catalyst is 0.5-2%.

For example, the content of the catalyst in the molecular sieve catalyst may be 1.0%, 1.5%, 2.5%, or soon.

In the integrated three way and molecular sieve catalyst system of the present invention, the base body is preferably a honeycomb ceramic base body.

The present invention also provides a method for preparing the above-mentioned catalyst system, characterized in that, the method comprising steps as follows.

1) Preparation of a Three Way Catalyst Powder:

Adding an active component precursor of the three way catalyst to a carrier of the three way catalyst by spraying with stirring, stirring for 1-2 hours after completing the spraying, drying in an oven at 120° C. for 6-8 hours, and then calcining at 500-600° C. for 1-2 hours to obtain the three way catalyst powder. For example, after completing the spraying, the mixture may be stirred for another 1.5 hours, dried in an oven at 120° C. for 7 hours, and then calcined at 550° C. for 1.5 hours.

2) Preparation of a Molecular Sieve Catalyst Powder:

Exchanging an active component precursor of the molecular sieve catalyst into a framework of a molecular sieve by an ion exchanging method, washing, filtering, then drying in an oven at 120° C. for 6-8 hours, and calcining at 500-650° C. for 1-2 hours to obtain the molecular sieve catalyst powder. For example, after completing the spraying, the mixture may be stirred for another 1.5 hours, dried in an oven at 120° C. for 7 hours, and then calcined at 550° C. for 1.5 hours.

3) Preparation of the Integrated Catalyst System:

S01. Mixing the three way catalyst powder and the molecular sieve catalyst powder respectively with 1-5 wt. % of binder, and ball milling the obtained mixture to produce a three way catalyst slurry and a molecular sieve catalyst slurry respectively;

Mixing the three way catalyst powder and the molecular sieve catalyst powder, then mixing a mixture of the three way catalyst powder and the molecular sieve catalyst powder with 1-5 wt. % of binder, and ball milling the obtained mixture to produce a mixed catalyst slurry.

For example, the amount of the binder may be 1 wt. %, 2.5 wt. %, 3 wt. %, or 5 wt. %.

S02. Preparation of the integrated catalyst system

Applying the mixed catalyst slurry on a surface of a base body, drying, and then calcining at 500-650° C. for 1-2 hours to obtain the integrated catalyst system. For example, after drying, the materials may be calcined at 600° C. for 1.5 hours.

Alternatively, applying the three way catalyst slurry on a surface of the base body, drying, then applying the molecular sieve catalyst slurry, drying, and then calcining at 500-650° C. for 1-2 hours to obtain the integrated catalyst system. For example, after drying, the materials may be calcined at 600° C. for 1.5 hours.

Alternatively, applying ⅓-⅔ of the three way catalyst slurry on a surface of the base body, drying, then applying the molecular sieve catalyst slurry, drying, then applying a remainder of the three way catalyst slurry, drying, and then calcining at 500-650° C. for 1-2 hours to obtain the integrated catalyst system. For example, after drying, the materials may be calcined at 600° C. for 1.5 hours.

Alternatively, applying the three way catalyst slurry on a surface of a former segment of the base body, applying the molecular sieve catalyst slurry on a surface of a latter segment of the base body, drying, and then calcining at 500-650° C. for 1-2 hours to obtain the integrated catalyst system. For example, after drying, the materials may be calcined at 600° C. for 1.5 hours.

The precursors of the active components refer to nitrate, tetraamine nitrate or another inorganic salt of each of the active components. For example, the precursors of the active components are platinum nitrate, palladium nitrate, rhodium nitrate, tetraamineplatinum nitrate, tetraaminepalladium nitrate, chloroplantinic acid and so on. The solution of the active component precursor may be a solution of single active component precursor, a mixed solution of multiple active component precursor, or a mixed solution of a precursor solution and an auxiliary agent solution.

The binder includes, but not limited to, highly viscous alumina sol and silica sol. During the ball milling, the solid content of the slurry is controlled to 25-50%. For example, the solid content of the slurry may be 25%, 35%, 40% and 50%.

EXAMPLES

Comparative Example 1

A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. for 6 h, and calcined at 550° C. for 2 hours to obtain a Pd precious metal powder with 4.13% of Pd. A platinum nitrate solution with a Pt content of 3.53 g was added to 96.47 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. 50.77 wt % of the above Pd precious metal powder, 26.72 wt % of the above Pt precious metal powder, 17.52 wt % of the above Rh precious metal powder, and 4.99 wt % of highly viscous material were placed in a ball mill tank, and ball milled with adding de-ionized water to obtain a slurry 1. The slurry 1 was applied on a cordierite honeycomb ceramic carrier in an applied amount of 168.4 g/L on a dry basis. The materials were dried at 120° C., and then calcined at 500° C. for 2 hours to obtain a natural gas tail gas purification catalyst with a precious metal content of 150 g/ft³. The dimension of the catalyst is as follows: φ 1 inch×2 inches.

Example 1

Mono-layer applying was used for the catalyst. A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. overnight, and calcined at 550° C. for 2 hours to obtain a Pd precious metal powder with 4.13% of Pd. A platinum nitrate solution with a Pt content of 3.53 g was added to 96.47 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. A SAPO molecular sieve was placed in a copper nitrate solution for ion exchange. After completing the exchange, the material was washed, dried, and calcined to obtain a Cu-SAPO molecular sieve powder with a copper content of 3%. 36.92 wt % of the above Pd precious metal powder, 19.43 wt % of the above Pt precious metal powder, 12.74 wt % of the above Rh precious metal powder, 25.91% of the 3% Cu-SAPO molecular sieve powder, and 5 wt % of highly viscous material were placed in a ball mill tank, and ball milled with adding de-ionized water to obtain a slurry 1. The slurry 1 was applied on a cordierite honeycomb ceramic carrier in an applied amount of 231.6 g/L on a dry basis. The materials were dried at 120° C., and then calcined at 500° C. for 2 hours to obtain a natural gas tail gas purification catalyst with a precious metal content of 150 g/ft³. The dimension of the catalyst is as follows: φ 1 inch×2 inches.

Example 2

Double-layer applying was used for the catalyst. A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. overnight, and calcined at 550° C. for 2 hours to obtain a Pd precious metal powder with 4.13% of Pd. A platinum nitrate solution with a Pt content of 3.53 g was added to 96.47 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. A SAPO molecular sieve was placed in a copper nitrate solution for ion exchange. After completing the exchange, the material was washed, dried, and calcined to obtain a Cu-SAPO molecular sieve powder with a copper content of 3%. 50.77 wt % of the above Pd precious metal powder, 26.72 wt % of the above Pt precious metal powder, 17.52 wt % of the above Rh precious metal powder, and 4.99 wt % of highly viscous material were placed in a ball mill tank, and ball milled with adding de-ionized water to obtain a slurry 1. 95% of the 3% Cu-SAPO molecular sieve powder and 5% of highly viscous material were place in a ball mill tank, and ball milled with adding de-ionized water to obtain a slurry 2. The slurry 1 was applied to a cordierite honeycomb ceramic carrier in an applied amount of 168.4 g/L on a dry basis. The materials were dried at 120° C. Then, the slurry 2 was applied on the catalyst applied on the bottom layer in an applied amount of 63.16 g/L on a dry basis. The materials were dried at 120° C., and calcined at 550° C. for 2 hours to obtain a natural gas tail gas purification catalyst with a precious metal content of 150 g/ft³. The dimension of the catalyst is as follows: φ 1 inch×2 inches.

Example 3

Three-layer applying was used for the catalyst. A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. overnight, and calcined at 550° C. for 2 hours to obtain a Pd precious metal powder with 4.13% of Pd. A platinum nitrate solution with a Pt content of 3.53 g was added to 96.47 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. A SAPO molecular sieve was placed in a copper nitrate solution for ion exchange. After completing the exchange, the material was washed, dried, and calcined to obtain a Cu-SAPO molecular sieve powder with a copper content of 3%. 95 wt % of the above Pd precious metal powder and 5% of highly viscous material were place in a ball mill tank, and ball milled with adding de-ionized water to obtain a slurry 1. 57.4 wt % of the above Pt precious metal powder, 37.6 wt % of the above Rh precious metal powder, and 5 wt % of highly viscous material were placed in a ball mill tank, and ball milled with adding de-ionized water to obtain a slurry 2. 95% of the 3% Cu-SAPO molecular sieve powder and 5% of highly viscous material were place in a ball mill tank, and ball milled with adding de-ionized water to obtain a slurry 2. The slurry 1 was applied to a cordierite honeycomb ceramic carrier in an applied amount of 90 g/L on a dry basis. The materials were dried at 120° C. Then, the slurry 3 was applied on the catalyst applied on the bottom layer in an applied amount of 63.16 g/L on a dry basis. The materials were dried at 120° C. Then, a third applying was performed to apply the slurry 2 in an applied amount of 78.4 g/L on a dry basis. The materials were dried at 120° C. and calcined at 550° C. for 2 h to obtain a natural gas tail gas purification catalyst with a precious metal content of 150 g/ft$^3$. The dimension of the catalyst is as follows: φ 1 inch×2 inches.

Example 4

Segmented applying was used for the catalyst. A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. overnight, and calcined at 550° C. for 2 hours to obtain a Pd precious metal powder with 4.13% of Pd. A platinum nitrate solution with a Pt content of 1.672 g was added to 98.33 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. A SAPO molecular sieve was placed in a copper nitrate solution for ion exchange. After completing the exchange, the material was washed, dried, and calcined to obtain a Cu-SAPO molecular sieve powder with a copper content of 3%. 50.77 wt % of the above Pd precious metal powder, 26.72 wt % of the above Pt precious metal powder, 17.52 wt % of the above Rh precious metal powder, and 4.99 wt % of highly viscous material were placed in a ball mill tank, and ball milled with adding de-ionized water to obtain a slurry 1. 95% of the 3% Cu-SAPO molecular sieve powder and 5% of highly viscous material were place in a ball mill tank, and ball milled with adding de-ionized water to obtain a slurry 2. The slurry 1 was applied to a former ⅔ segment of a cordierite honeycomb ceramic carrier in an applied amount of 200 g/L on a dry basis. The materials were dried at 120° C. Then, the slurry 2 was applied on a latter ⅓ segment of the cordierite honeycomb ceramic carrier in an applied amount of 200 g/L on a dry basis. The materials were dried at 120° C., and calcined at 550° C. for 2 h to obtain a natural gas tail gas purification catalyst with a precious metal content of 150 g/ft$^3$. The segment containing the precious metal coating was a gas inlet end, and the segment containing the molecular sieve coating was a gas outlet end. The dimension of the catalyst is as follows: φ 1 inch×3 inches.

Example 5

Segmented applying was used for the catalyst. A palladium nitrate solution with a palladium content of 4.13 g was added to 96 g of lanthanum-modified aluminum oxide. A precious metal solution was added to the modified aluminum oxide material by spraying with stirring. After completing the spraying of the precious metal solution, the mixture was stirred for another 1 h, then dried at 120° C. overnight, and calcined at 550° C. for 2 hours to obtain a Pd precious metal powder with 4.13% of Pd. A platinum nitrate solution with a Pt content of 1.672 g was added to 98.33 g of ceria-zirconia solid solution in the same way to obtain a Pt precious metal powder with 3.53% of Pt. A rhodium nitrate solution with a Rh content of 0.6 g was added to 99.4 g of ceria-zirconia solid solution in the same way to obtain a Rh precious metal powder with 0.6% of Rh. A SSZ-13 molecular sieve was placed in a solution of platinum nitrate and palladium nitrate for ion exchange. After completing the exchange, the material was washed, dried, and calcined to obtain a 0.1% Pt-0.2% Pd-SSZ-13 molecular sieve powder. 50.77 wt % of the above Pd precious metal powder, 26.72 wt % of the above Pt precious metal powder, 17.52 wt % of the above Rh precious metal powder, and 4.99 wt % of highly viscous material were placed in a ball mill tank, and ball milled with adding de-ionized water to obtain a slurry 1. 95% of the 0.1% Pt-0.2% Pd-SSZ-13 molecular sieve powder and 5% of highly viscous material were place in a ball mill tank, and ball milled with adding de-ionized water to obtain a slurry 2. The slurry 1 was applied to a former ⅔ segment of a cordierite honeycomb ceramic carrier in an applied amount of 200 g/L on a dry basis. The materials were dried at 120° C. Then, the slurry 2 was applied on a latter ⅓ segment of the cordierite honeycomb ceramic carrier in an applied amount of 200 g/L on a dry basis. The materials were dried at 120° C., and calcined at 550° C. for 2 h to obtain a natural gas tail gas purification catalyst with a precious metal content of 150 g/ft$^3$. The segment containing the precious metal coating was a gas inlet end, and the segment containing the molecular sieve coating was a gas outlet end. The dimension of the catalyst is as follows: φ 1 inch×3 inches.

Comparative Example 2

The natural gas three way catalyst with a precious metal content of 150 g/ft$^3$ in Comparative Example 1 was placed on a former end. Then, a conventional commercially available SCR catalyst used for diesel engines with a volume of φ 1 inch×1 inch was added after the three way catalyst. Both of them were packaged together and placed under the following condition for activity testing.

Activity evaluation test was performed on the catalysts of the above Examples and Comparative Example. The test condition was as shown below:

simulated volume composition of gases in the tail gas of a natural gas engine: $CH_4$: 1000 ppm, CO: 4000 ppm, NO: 1000 ppm, $O_2$: 3500 ppm, $H_2O$: 10%, $CO_2$: 10%, $N_2$: balance gas; space velocity: 100000 h$^{-1}$. The conversion rates of various pollutants at 500° C. are shown in Table 1.

TABLE 1

| | \multicolumn{5}{c}{Conversion rates of various pollutants at 500° C. for catalysts of different examples.} | | | | |
|---|---|---|---|---|---|
| | $CH_4$ conversion (%) | CO conversion (%) | NO conversion (%) | $NH_3$ production (ppm) | $NH_3$ conversion (%) |
| Comparative Example 1 | 99 | 91 | 100 | 58 | — |
| Example 1 | 95 | 91 | 100 | 3 | 94.8 |
| Example 2 | 92 | 92 | 99 | 5 | 91.4 |
| Example 3 | 96 | 90 | 99 | 5 | 91.4 |
| Example 4 | 94 | 93 | 99 | 10 | 82.8 |
| Example 5 | 94 | 93 | 99 | 4 | 93.1 |
| Comparative Example 2 | 99 | 91 | 100 | 42 | 27.6 |

It can be seen from Table 1 that:

1) the three way catalyst in Comparative Example 1 had high conversion rates for all three pollutants, CO, $CH_4$ and NO, with an average conversion rate exceeding 90%, but since no SCR catalyst was added in the coating, the emission of $NH_3$ is high, far beyond the emission limit of the China VI phase regulation (10 ppm);

2) in Examples 1-5, after adding the molecular sieve catalyst, the catalyst system had relatively high conversion rates for CO, $CH_4$ and NO, while significantly reducing the emission of byproduct NH₃, such that the emission of the tail gas meets the requirement of the China VI phase regulation.

3) The conventional commercially available SCR catalyst for diesel engines used in Comparative Example 2 had some effect on the conversion of NH$_3$, but the conversion rate was too low, failing to meet the emission requirement of the China VI phase regulation.

In sum, the catalyst system integrating a three way catalyst and a molecular sieve according to the present invention can treat pollutants such as CO, HC and NO$_x$ in a tail gas of a stoichiometric-burn natural gas vehicle, while treating a produced byproduct NH$_3$, with very high conversion rates for CO, HC, NO$_x$ and NH$_3$.

The invention claimed is:

1. An integrated catalyst system for a stoichiometric-burn natural gas vehicle, wherein the catalyst system comprises a base body and one or more coatings thereon comprising a three-way catalyst and a molecular sieve catalyst,
the three-way catalyst comprises platinum, palladium, rhodium and a first carrier comprising lanthanum-modified aluminum oxide and a ceria-zirconia solid solution, wherein a weight ratio of the platinum, the palladium and the rhodium in the three-way catalyst is (0.2-0.5):(0.5-0.8):(0.05-0.2);
the molecular sieve catalyst comprises a second carrier and an active component, the second carrier is a small pore molecular sieve material, and the active component is copper in an amount of 2.5-5% of the molecular sieve catalyst or a mixture of platinum and palladium in an amount of 0.1-3% of the molecular sieve catalyst;
the one or more coatings comprise:
a coating layer comprising a uniform mixture of the three-way catalyst and the molecular sieve catalyst; or
a first coating comprising the three-way catalyst and a second coating comprising the molecular sieve catalyst on a surface of the first coating; or
a first segment comprising the three-way catalyst on a former segment of the base body, and a second segment comprising the molecular sieve catalyst on a latter segment of the base body.

2. The integrated catalyst system according to claim 1, wherein a combined loading amount of the three-way catalyst and the molecular sieve catalyst is 150 g/L-300 g/L, and a loading amount ratio of the three-way catalyst to the molecular sieve catalyst is (1:3)-(3:1).

3. The integrated catalyst system according to claim 2, wherein the combined loading amount of the three-way catalyst and the molecular sieve catalyst is 200 g/L-300 g/L, and the loading amount ratio of the three-way catalyst to the molecular sieve catalyst is (1:1)-(2:1).

4. The integrated catalyst system according to claim 1, wherein in the carrier of the three-way catalyst, a weight ratio of the lanthanum-modified aluminum oxide and the ceria-zirconia solid solution is from 2:5 to 5:2.

5. The integrated catalyst system according to claim 1, wherein a content of the platinum, the palladium and the rhodium in the three-way catalyst is 80-200 g/ft³.

6. The integrated catalyst system according to claim 1, wherein the carrier of the molecular sieve catalyst is one or both of an aluminosilicophosphate molecular sieve or an aluminosilicate molecular sieve containing a CHA crystal framework structure.

7. The integrated catalyst system according to claim 1, wherein the one or more coatings comprise the coating layer comprising the uniform mixture of the three-way catalyst and the molecular sieve catalyst.

8. The integrated catalyst system according to claim 1, wherein the one or more coatings comprise the first coating comprising the three-way catalyst and the second coating comprising the molecular sieve catalyst on the surface of the first coating.

9. The integrated catalyst system according to claim 1, wherein the one or more coatings comprise the first coating and the second coating.

10. The integrated catalyst system according to claim 9, wherein the one or more coatings further comprise a third coating comprising the three-way catalyst on the second coating.

11. The integrated catalyst system according to claim 1, wherein the one or more coatings comprise the first segment comprising the three-way catalyst on the former segment of the base body, and the second segment comprising the molecular sieve catalyst on the latter segment of the base body.

12. The integrated catalyst system according to claim 11, wherein a height ratio of the first segment and the second segment is 2:1-1:2.

13. The integrated catalyst system according to claim 1, wherein the active component of the molecular sieve catalyst is copper in an amount of 2.5-3% of the molecular sieve catalyst.

14. The integrated catalyst system according to claim 1, wherein the active component is the mixture of platinum and palladium in an amount of 0.1-1.0% of the molecular sieve catalyst.

15. The integrated catalyst system according to claim 1, wherein the content of the platinum, the palladium and the rhodium in the three-way catalyst is 120-180 g/ft³.

16. The integrated catalyst system according to claim 15, wherein the content of the platinum, the palladium and the rhodium in the three-way catalyst is 120-150 g/ft³.

17. The integrated catalyst system according to claim 1, wherein the weight ratio of the platinum, the palladium and the rhodium in the three-way catalyst is 0.3:0.6:0.1.

18. The integrated catalyst system according to claim 1, wherein the base body comprises a honeycomb ceramic.

19. The integrated catalyst system according to claim 18, wherein the honeycomb ceramic comprises a cordierite honeycomb ceramic carrier.

* * * * *